United States Patent Office 2,897,171
Patented July 28, 1959

2,897,171

PROCESS FOR IMPROVING THE FLOWING QUALITIES OF PHENOL-FORMALDEHYDE MOLDING COMPOSITIONS AND MOLDING COMPOSITIONS RESULTING THEREFROM

Ludwig Cserny, Wiesbaden-Sonnenberg, and Joseph Schmitz, Wiesbaden-Biebrich, Germany, assignors to Chemische Werke Albert, Wiesbaden-Kastel (Amoneburg), Germany, a corporation of Germany No Drawing. Application June 15, 1953
Serial No. 361,836
Claims priority, application Germany June 25, 1952
16 Claims. (Cl. 260—32.8)

This invention relates to processes for increasing the flowing capacity of heat-hardenable, artificial resin moldable compositions in pieces of any size or shape, including powder, granules, shreds and shavings, and including sheets and veneers. It also relates to the products producible by this process which may be defined as heat-hardenable artificial resin molding compositions in the form of pieces of any size or shape, the surfaces of which are swelled by the presence of a swelling solvent for the resin component of the composition.

The flowing qualities of molding compositions may be inadequate for any one of a number of reasons. For example, the pieces may be overpolymerized or overfilled intentionally for some advantage or unintentionally by accident, or, the mold shape may be too deep, or the mold size may be too large, or the pressure capacity of the mold may be inadequate for the grade or quality of the composition at hand.

The object of the invention, broadly expressed, is to impart increased flowing capacity, in a controlled predetermined amount, to heat-moldable compositions possessing, for any reason, inadequate flowing qualities.

A specific object is to provide a process for making it possible to use relatively low pressures for the molding of hard, molding compositions whereby the advantages of considerably pre-cured molding masses or pieces can be utilized where otherwise the molding procedure would be difficult or impracticable.

Another object is to provide a process capable of reducing the molding pressure required for the production of larger molded parts from ordinary molding compositions, whereby molding presses can be used more economically.

Another object is to make possible the production of improved laminated molding composition of improved strength due to superior bonding resulting from better flowing of the resin on the surfaces of the sheets or veneers during pressure in the molding operation.

Another object is to provide a flow-enhancing process which permits the use of increased amounts of filler in molding compositions.

Broadly considered, the invention involves procedures for swelling the resin of the molding composition including the application to the surfaces of the powder, sheets or other pieces of the molding composition at any time prior to molding, vapors of a swelling solvent in proper amount, said solvent having the capacity for swelling the particular resin at hand and being vaporizable at a temperature below 100° C.

In accordance with a most important embodiment of the invention, the solvent is applied with the aid of a vacuum. While the moldable resin is in a confined space or enclosure, the atmosphere is evacuated therefrom and then vapors of the solvent are admitted to the space where it is taken up in and on the surfaces of the pieces of the composition and causes the same to swell. Through this procedure, the process is carried out quickly and with particular efficiency.

As swelling agents there may be used in general, all vapors, or compounds which can be converted into vapor form at temperatures below 100° C. which have the property of causing swelling of the resin component of the molding compositions being treated. Among the swelling agents there may be mentioned vapors of ammonia, of aldehydes (such as paraldehyde, propaldehyde and butyraldehyde) and of solvents of most varied types, such as vapors of ethyl and methyl alcohol and of ketones such as acetone. When phenolic resins, as phenol resins and cresol resins, are to be treated, vapors of mixed methyl or ethyl alcohol with acetone may be used to particular advantage.

The invention is applicable to all heat-hardenable artificial resin molding compositions, the resin component of which is capable of being swelled by a solvent of the properties hereinbefore described. For example, there may be mentioned the phenol-aldehyde molding compositions and other like products such as urea-, thiourea-, melamine-aldehyde molding compositions mentioned by Carleton Ellis in "The Chemistry of Synthetic Resins," 1935, page 454 and following, and page 606 and following.

The amount of the swelling solvent to be applied to the molding compositions is not ordinarily critical unless very precise molding characteristics are required. In order to obtain the practical results of the present invention the solvent should be introduced in a quantity which causes the molding composition to take up from about 0.5% up to about 3.5% or somewhat more, by weight.

When the vapors of the solvent are applied to a previously evacuated molding composition, the application may be accomplished practically instantaneously and with uniformity. The treatment requires only a few seconds and the adequacy of the charge of vapor can be ascertained by observing condensation of an excess of the solvent on the surfaces of the pieces of the molding composition.

In an alternative procedure in which no visible condensate is permitted to form on the molding composition, the temperature of the solvent is maintained somewhat higher than that of the molding composition to be treated and the speed of the vapor treatment is regulated through control of this difference in temperature. The adequacy of the solvent introduction can be ascertained by the observance of the pressure change registered on a manometer.

The treatment with the vapor can be carried out in any chamber or enclosure in which the molding composition to be treated can be held or stored and into which vapor can be introduced. If the solvent is a very volatile swelling agent as, for example, ethyl alcohol, methanol, or acetone, the liquid may be merely placed within the chamber along with the pieces of the molding composition, the surfaces of which are exposed to the atmosphere in the chamber.

The preferred procedure for applying the swelling agent to molding compositions in the form of a powder or small pieces involves utilization of a rotating drum or other device in which the moldable material is turned over while vapors of the swelling solvent are being introduced. Through the use of this procedure the surfaces of the pieces of the molding composition are uniformly charged with vapor and sticking together of the particles is avoided.

For the production of molded laminates the sheets or veneers to be pressed together are passed through a chamber while supported on an endless band, into which chamber the vapor of the swelling solvent is introduced. Alternatively the sheets or veneers may be placed on suitable racks in the chamber during the treatment.

One of the accomplishments of the instant invention resides in the ability to produce molded products containing larger amounts of filler than is ordinarily possible. The saving in amount of resin required may be substantial, for when organic fillers are employed the proportion of filler to resin can be at least 60% and when inorganic fillers are employed the composition may contain as much as 70% filler.

*Example*

For carrying out the process, there may be used a container or vessel capable of withstanding a vacuum, equipped with a supporting screen, a three-way cock and a manometer. The molding composition to be treated composed of an over-hardened phenol-formaldehyde resin composition containing wood flour as a filler is introduced into the container such that it rests upon the screen support. After the container is closed the atmosphere is evacuated from the container through the three-way cock either by direct connection with a vacuum pump or by connection with a larger, previously evacuated container. A vacuum in the range of about 30 to 20 Torr is sufficient.

After the desired vacuum is reached, the three-way cock is switched to connect to an acetone-containing vessel. Atmospheric air is then sucked from an air inlet tube connecting into the acetone vessel thence through the acetone into the vessel containing the molding composition. The action of the vacuum and of the current of air together cause intensive vaporization of the acetone. The acetone in the acetone container is kept at a temperature about 8° to 12° higher than the temperature of the moldable material to be treated. When the manometer reads at about 200 Torr, which occurs in a few seconds, the amount of introduced acetone is sufficient to provide a molding composition containing a vapor charge of about 1%. The introduction of vapor may be terminated simply by opening the cock to the atmosphere such that air directly enters the container. Finally the mass thus treated with the vapor is discharged from the container.

To compare the flowing qualities of the molding composition before and after the foregoing treatment, cups were molded under comparable conditions from samples of the composition before and after treatment. The closing time of the mold using the untreated composition was 51 seconds whereas the molding time in the production of the cup using the molding composition treated with acetone in accordance with the present invention was only 10.8 seconds. Through the incorporation of approximately 1% of acetone the flowing capacity was increased by about 80%.

In the operation of the foregoing process, the time of treatment with the vapor can also be adjusted by regulation of the passage of air through the inlet tube, for example, by means of a needle valve. This control of the air vapor and also the control of the difference in temperature permits accurate regulation of the amount of vapor introduced whereby consistent results can be obtained.

Although the process of the invention can be carried out without the application of vacuum, the procedure making use of the vacuum method is much preferred. In addition to speed and reliability of control in carrying out the vapor treatment, the vacuum treatment has the advantage that the natural, and partly necessary, content of volatile substances in the moldable material is not increased by the absorption of vapor in a manner which would seriously affect the molding process. The evacuation of the molding mass prior to treatment with the vapor reduces the content of volatile constituents such as water and the introduction of the vapor merely replaces the removed volatile materials in almost an equivalent quantity.

The molding compositions treated with a swelling solvent in accordance with the procedure of the present invention can be molded directly after such treatment or after a surprising number of hours, or at any time thereafter provided the molding material is kept in suitable containers as for example in tightly sealed drums. It has been determined that the swelling solvent adheres strongly to the moldable materials for many hours in amounts of from about 0.5 to 1.5% and this amount is often sufficient to provide adequate flowing properties. In view of normal delays in molding operations this retention of flowing qualities is of substantial practical value.

The process of the present invention has a number of advantages and in particular when a vacuum is used to assist the application of the solvent. The advantages of applicants' process include the following:

(1) The flowing qualities of heat-hardenable molding compositions can be controlled to a material and valuable extent independently of the inherent characteristics of the molding resin or composition containing the same.

(2) Excessively hard molding compositions can be molded under relatively low pressures. Hence operators can take advantage of a considerably precured molding composition which otherwise could be molded only under difficult or impractical conditions.

(3) Larger molded parts or articles can be produced in view of the low pressure required for the molding compositions of improved flowing properties.

(4) The molding operation can be more economically run because of the reduced pressure required.

(5) Molding presses will have an increased life in view of the reduced operating cycle, in view of the better flowing capacity of the compositions of the invention.

(6) Laminated molded products utilizing sheets or veneers which are known to be difficult to mold satisfactorily can be welded together with greater ease in view of the better flowing of the artificial resin component. Furthermore, the bond between the individual layers is improved and it is possible to obtain excellent bonding even though the resin ingredient may have been precured to a relatively high degree for some particular advantage.

(7) Molding compositions having required flowing capacity can in many instances be prepared from compositions in which the resin content does not exceed 40% when organic fillers are used and does not exceed 30% when inorganic fillers are employed. Hence the molding compositions will be lower in cost.

(8) Molding compositions which have undergone undesired hardening as the result of storage for too long a period or as a result of hot storage conditions resulting in stiffening of the molding compound can be restored to a suitable flowing capacity.

(9) The present process need not be carried out in connection with or as a part of the molding composition production process, for it can be carried out after the initial production is complete either by the manufacturer of the molding composition or at any other desired place of further process, or even by the molder who may have purchasd the molding composition.

It should be understood that the present invention is not limited to the specific details herein set out but that it extends to all equivalent materials and procedures which will occur to those skilled in the art upon consideration of the general tenor and scope of the claims appended hereto.

We claim:

1. A process for improving the flowing qualities of heat-hardenable, phenol-formaldehyde resin, molding compositions which comprises swelling the surface layer of said compositions by applying thereto in vaporous form a swelling solvent for the resin therein in a quantity which causes the composition to take up not more than 3.5% thereof by weight, said solvent being selected from the group consisting of ammonia, aldehydes, alcohols, and ketones, and vaporizable at a temperature below 100° C.

2. A process for improving the flowing qualities of heat-hardenable, resin molding compositions, the resin being derived from formaldehyde and phenol, which comprises applying to the composition a vapor of a solvent selected from the group consisting of ammonia, aldehydes, alcohols, and ketones, which solvent is convertible into vapor form at a temperature under 100° C. the quantity used being that which causes the composition to take up not more than 3.5% thereof, by weight, said solvent having the property of swelling the resin, whereby the surface layers of the composition become swollen.

3. A process for improving the flowing qualities of heat-hardenable, phenol-formaldehyde resin, molding compositions which comprises evacuating the atmosphere surrounding said composition and applying to the composition a vapor of a solvent selectd from the group consisting of ammonia, aldehydes, alcohols, and ketones, which solvent is convertible into vapor form at a temperature under 100° C. the quantity used being that which causes the composition to take up not more than 3.5% thereof, by weight, said solvent having the property of swelling the resin, whereby the surface layers of the composition become swollen.

4. A process for improving the flowing qualities of heat-hardenable, phenol-formaldehyde resin, molding compositions which comprises applying to the composition a vapor of a solvent convertible into vapor form at a temperature under 100° C. in a quantity which causes the composition to take up from about 0.5 to 3.5% thereof by weight, said solvent being selected from the group consisting of ammonia, aldehydes, alcohols, and ketones, and having the property of swelling the resin, whereby the surface layers of the composition become swollen.

5. A process for improving the flowing qualities of heat-hardenable, phenol-formaldehyde resin, molding compositions which comprises applying to the composition while under vacuum a vapor of a solvent selected from the group consisting of ammonia, aldehydes, alcohols, and ketones, which solvent is convertible into vapor form at a temperature under 100° C., the quantity used being that which causes the composition to take up from about 0.5 to 3.5% thereof by weight, said solvent having the property of swelling the resin, whereby the surface layers of the composition become swollen.

6. A process for improving the flowing qualities of heat-hardenable, phenol-formaldehyde resin, molding compositions which comprises evacuating the atmosphere surrounding said composition, and applying a swelling solvent selected from the group consisting of ammonia, aldehydes, alcohols, and ketones, to said composition in a quantity which causes the composition to take up not more than 3.5% thereof, by weight by breaking the vacuum through the admission of an air stream laden with said solvent, wherby the surface layers of the composition become swollen.

7. A process for improving the flowing qualities of heat-hardenable, phenol-formaldehyde resin, molding compositions which comprises evacuating the atmosphere surrounding said composition, applying a swelling solvent selected from the group consisting of ammonia, aldehydes, alcohols, and ketones, to said composition in a quantity which causes the composition to take up not more than 3.5% thereof, by weight, by reducing the vacuum through the admission of an air stream containing vapors of said solvent picked up by flow of the air through a body of the solvent, and discontinuing the application of solvent when condensation of the same upon surfaces of the composition appears, whereby the surface layers of the composition become swollen.

8. A process for improving the flowing qualities of heat-hardenable, phenol-formaldehyde resin, molding compositions containing fillers in such large quantities as to impart poor flowing qualities if molded by the use of conventional procedures which comprises applying to the high filler content resin molding composition a swelling solvent for said resin in a quantity which causes the composition to take up not more than 3.5% thereof, by weight, said solvent being one capable of volatilization at a temperature under 100° C. and selected from the group consisting of ammonia, aldehydes, alcohols, and ketones, whereby the surface layers of the composition become swollen.

9. A process for improving the flowing qualities of highly filled heat-hardenable, phenol-formaldehyde resin, molding compositions, which comprises applying to such molding composition containing a filler selected from the group consisting of organic fillers in a quantity of at least 60% and inorganic fillers in a quantity of at least 70%, by weight, a swelling solvent for said resin in a quantity which causes the composition to take up not more than 3.5% thereof, by weight, said solvent being one capable of volatilization at a temperature under 100° C. and selected from the group consisting of ammonia, aldehydes, alcohols, and ketones, whereby the surface layers of the composition become swollen.

10. A process for improving the flowing qualities of heat-hardenable, phenol-formaldehyde resin, molding compositions which comprises applying acetone in vapor form to the surfaces of the pieces of the composition such that the acetone penetrates only the surface layers and causes swelling of the same, the amount of acetone applied being that which causes the composition to take up not more than 3.5% thereof, by weight.

11. A process for improving the flowing qualities of filled heat-hardenable, phenol-formaldehyde resin, molding compositions which comprises applying to the surface layers of the pieces of the molding composition vapors of acetone, thereby causing the surface layers to swell by taking up from about 0.5 to 3.5% of acetone, by weight.

12. A process for restoring flowing qualities to over-polymerized heat-hardenable, phenol-formaldehyde resin, molding compositions which comprises enclosing pieces of the said composition, evacuating the atmosphere from the enclosure, exposing substantially all of the surface layers of the said pieces, introducing into the enclosure vapors of a swelling solvent for the resin of the molding composition in a quantity which causes the composition to take up not more than 3.5% thereof, by weight, said solvent being vaporizable at a temperature below 100° C., and selected from the group consisting of ammonia, aldehydes, alcohols, and ketones, whereby the solvent is taken up on substantially all of the surfaces of said pieces, restoring the enclosure to normal atmospheric pressure and removing the pieces of the composition from the enclosure, whereby enhanced flowing qualities are imparted to the molding compositions.

13. Molding compositions of improved flowing qualities comprising heat-hardenable, phenol-formaldehyde resin, molding compositions the surface layers of the pieces of which are swollen by the presence of not more than 3.5%, by weight of a swelling solvent for the resin of the composition, said solvent being vaporizable at a temperature below 100° C. and selected from the group consisting of ammonia, aldehydes, alcohols, and ketones.

14. A molding composition of good flowing qualities comprising a heat-hardenable, phenol-formaldehyde resin extended with a filler in such large quantity that the composition containing the same possesses poor flowing qualities if molded normally, the surface layers of the pieces of the composition being swollen by the presence of from about 0.5 to about 3.5%, by weight, of a swelling solvent for the resin of the composition, said solvent being vaporizable at a temperature below 100° C. and selected from the group consisting of ammonia, aldehydes, alcohols, and ketones.

15. Phenolic molding compositions of improved flowing qualities made up of pieces of a filled, heat-hardenable, molding resin derived from formaldehyde and phenol, the pieces being swollen by the presence of acetone absorbed in the surface layers thereof in a quantity of from about 0.5 to 3.5%, by weight.

16. An improved process for the molding of thermosetting resin molding compositions lacking in flowing qualities which comprises, swelling the surface layers of the particles of the molding composition containing a heat-hardenable resin derived from formaldehyde and phenol, by applying thereto in vaporous form a solvent which is capable of and does swell the resin of said composition, and in a quantity which causes the composition to take up from 0.5 to about 3.5% thereof, by weight, said solvent being substantially completely vaporizable at a temperature below 100° C. and selected from the group consisting of ammonia, aldehydes, alcohols and ketones, and molding the composition containing the particles having the swelled surfaces, the solvent for the most part being volatilized during the molding operation.

References Cited in the file of this patent

UNITED STATES PATENTS

| | | |
|---|---|---|
| 1,443,936 | Weisberg | Jan. 30, 1923 |
| 1,609,506 | Brock | Dec. 7, 1926 |
| 2,097,885 | Koppe | Nov. 2, 1937 |
| 2,118,036 | Botty et al. | May 24, 1938 |
| 2,477,009 | Sandler | July 26, 1949 |
| 2,497,346 | Collins | Feb. 14, 1950 |